United States Patent [19]

Kumakura

[11] Patent Number: 4,769,666
[45] Date of Patent: Sep. 6, 1988

[54] APPARATUS FOR DETERMINING AMOUNT OF FLASH

[75] Inventor: Toshiyuki Kumakura, Kanagawa, Japan

[73] Assignee: Canon Kabushiki Kaisha, Tokyo, Japan

[21] Appl. No.: 947,986

[22] Filed: Dec. 31, 1986

[30] Foreign Application Priority Data

Jan. 8, 1986 [JP] Japan .................................... 61-1596

[51] Int. Cl.$^4$ .............................................. G03B 7/00
[52] U.S. Cl. .................................... 354/413; 354/414; 354/416; 354/431
[58] Field of Search ............... 354/413, 414, 416, 417, 354/429, 430, 431, 432, 433, 434, 145.1

[56] References Cited

U.S. PATENT DOCUMENTS

| | | |
|---|---|---|
| 3,836,920 | 9/1974 | Uchiyama et al. .................. 354/414 |
| 3,855,601 | 12/1974 | Uchiyama et al. .................. 354/414 |
| 4,005,444 | 1/1977 | Uchiyama et al. .................. 354/414 |
| 4,063,257 | 12/1977 | Mashimo et al. .................... 354/414 |
| 4,188,104 | 2/1980 | Uchiyama et al. .................. 354/414 |
| 4,456,353 | 6/1984 | Mizokami ............................ 354/414 |

Primary Examiner—L. T. Hix
Assistant Examiner—David M. Gray
Attorney, Agent, or Firm—Fitzpatrick, Cella, Harper & Scinto

[57] ABSTRACT

An apparatus for determining the amount of flash having a first light receiving element for measuring light with respect to a first region (central region) of the frame, a second light receiving element for measuring light with respect to a second region (marginal region). The apparatus determines the amount of flash in accordance with the ratio of the outputs per unit area of the first and second light receiving elements.

6 Claims, 4 Drawing Sheets

APPARATUS FOR DETERMINING AMOUNT OF FLASH

BACKGROUND OF THE INVENTION

1. Field of Invention

This Invention relates to a flash photographic device and more particularly to a light measuring device suitable for use in daylight synchroflash photography.

2. Description of the Related Art:

It has been known to adopt a method of irradiating a main object with flash in back light, etc., so as to effect a proper exposure with respect to main and secondary objects, namely, a daylight synchroflash photography method. In this method, the shutter speed, aperture, etc., are preliminarily determined to properly adjust the exposure with respect to the secondary object included in the background within the frame, and flash is emitted toward the main object, thereby compensating for the lack of exposure with respect to the main object.

Traditionally, the amount of flash used for correcting the exposure for the main object is determined by employing a so-called flash light amount adjusting electronic flash apparatus having a light receiving element which receives reflected light generated by the emission of flash. However, this method is defective because, when the light introduced from the main object partially deviates from the photometry area of the light receiving element or when it is entirely applied to the photometry area but occupies only a part thereof, the amount of flash exceeds a suitable level, resulting in a photograph in which the main object is excessively bright relative to the background.

SUMMARY OF THE INVENTION

It is an object of the present invention to provide a light measuring device whereby, if the main object exists at a central portion of the frame which corresponds to a photometry region, a photometry operation for determining the correct amount of flash can be carried out irrespective of the area within this photometry region through which the light from the main object is measured.

To this end, the present invention provides in one of its aspects a light measuring device having a first light receiving portion for receiving light introduced from a central region of the frame, a second light receiving portion for receiving at least the light introduced from a marginal region encircling the above central region, and a circuit for determining the amount of flash on the basis of the ratio of the outputs of the first and second light receiving portions.

The present invention provides in another of its aspects a light measuring apparatus whereby emission of flash is stopped and the correct amount of flash is obtained when light reflected by objects, which is generated by the flash and received by a light receiving element having a photometry area substantially equal to that of the second light receiving element, reaches an amount which is determined in accordance with the ratio of the output per unit area of the first light receiving element for receiving the light introduced from the central region of the frame to the output per unit area of the second light receiving element for receiving light introduced from the marginal region encircling the central region of the frame.

The other objects and features of the present invention will become clear upon reading the following description with reference to the accompanying drawings.

DETAILED DESCRIPTION OF THE PREFERRED EMBODIMENTS

The photomatry principle of in accordance with the present invention will be described below with reference to FIGS. 1(a) to 1(d). FIG. 1 shows photometry regions relative to a frame in which a reference symbol A indicates a marginal region of the frame and reference symbol B indicates a central region of the frame. A region C is a light receiving region for a flash light amount adjusting process (for adjusting the amount of flash) which is equal to or substantially equal to the region B.

Figure 1A:
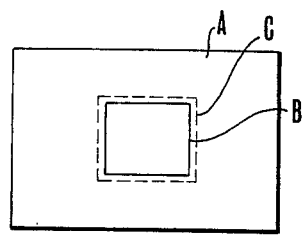
FIGS. 1(a), 1(b), 1(c) and 1(d) are diagrams showing the photometry principle in accordance with the present invention.
Figure 1B:
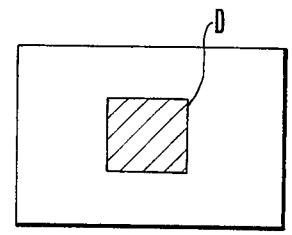

The photometry adopted in accordance with the present invention is first described with respect to a case in which a main object D occupies an area which corresponds to the central region B in the above-described photometry regions, as shown in FIG. 1(b).

It is assumed here that Bm represents the luminance of the main object and Bb represents the luminance of the background.

The luminance Bb of the background is detected on the basis of the photometric value of the region A, and the exposure of the camera (the aperture and the shutter speed) is determined on the basis of the luminance Bb. Flash is thereafter emitted, and the amount of flash is determined on the basis of the amount of light received with respect to the region C.

If the amount of flash per unit area for correctly exposing the main object is assumed to be P, the amount of flash P is represented by an equation:

$$P = P_0 \left(1 - \frac{Bm}{Bb}\right). \tag{1}$$

The amount of flash is controlled in accordance with this equation, thereby obtaining the exposure proper to the main object. $P_0$ represents the amount of light necessary for correcting the exposure for the main object which is supplied by the emission of flash alone when the luminance of the main object is zero and which is determined by the film speed ISO.

As represented by the equation (1), P is equal to $P_0$ when Bm=0. When the main object is considerably dark compared with the background, that is, when the main object is being photographed in an extremely intense back light, the amount of light $P_0$ is substantially equal to that necessary in ordinary night photography. When $Bm = \frac{1}{2}Bb$, $P = \frac{1}{2}P_0$; and an amount of light half as much as that required in night photography is necessitated. When the luminance of the main object is equal to that of the background, flash is not necessary.

Figure 1C:
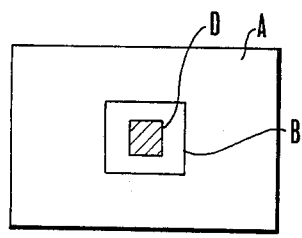

It is then assumed that the main object D is smaller than the region B and is positioned within the same, as shown in FIG. 1(c).

It is assumed here that the luminance of the main object is Bm; the area of the main object is Sm; the luminance of the background is Bb; the area of the partial light reading region is Sp; and the area of the marginal light reading region A is Sc. If the position and the area of the partial light reading region are equal to those of the flash light amount adjusting region, and if the total amount of flash received by a light receiving element with respect to the flash light amount adjusting region is designated by As, an equation:

$$As = Sm \times P \tag{2}$$

is obtained. The equation (2) represents the amount of flash which is obtained under the condition wherein the flash is reflected only by the main object and is not reflected by the background. This condition is satisfied in ordinary daylight synchroflash photography. The exposure is properly corrected for the main object so long as P in the equation (2) satisfies the condition (1).

If the total output of the photometry of the external light effected with respect to the central region is designated by Ap, an equation:

$$Ap = Sm \times Bm + (Sp - Sm)Bb \tag{3}$$

is set. If the output of the marginal photometry effected with respect to the region A is designated by Ac, the luminance Bb of the background is represented by an equation:

$$Ac = Sc \times Bb. \tag{4}$$

The equations (1), (3) and (4) are substituted in the equation (2) and the equation (2) is rearranged, thereby obtaining an equation:

$$As = A_0 \times \left(1 - \frac{Ap/Sp}{Ac/Sc}\right) \tag{5}$$

where $A_0 = P_0 \times Sp$. This equation means that a proper amount of light is obtained with respect to the main object by terminating the emission of flash when the value of As on the left side of the equation (5) reaches a value represented by the terms on the right side of the equation (5). The equation (5) does not include terms representing the area and luminace of the main object, so that a proper amount of flash can be determined irrespective of the area of the main object.

In the equation (5), $A_0 = P_0 \times Sp$ represents a reference flash light amount adjusting level.

Figure 1D:
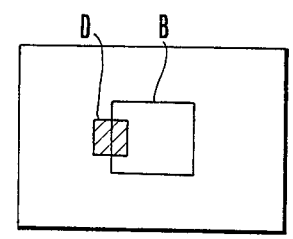

Next, the principle of the present invention will be described with respect to a case in which the main object D partly overlaps the photometry region B and slightly projects therefrom, as shown in FIG. 1(d). In this case, As is determined on the basis of the area of the object falling within the regions B and C, since Ap and Ac of the equations (3) and (4) in the equation (5) are obtained on the basis of signals representing the light received with respect to the regions B and C.

By adjusting the amount of flash on the basis of the equation (5), it is possible to properly control the amount of light irrespective of the area of that part of the main object which overlaps the regions B and C, if the main object at least partly overlaps the regions C and B.

Figure 2:
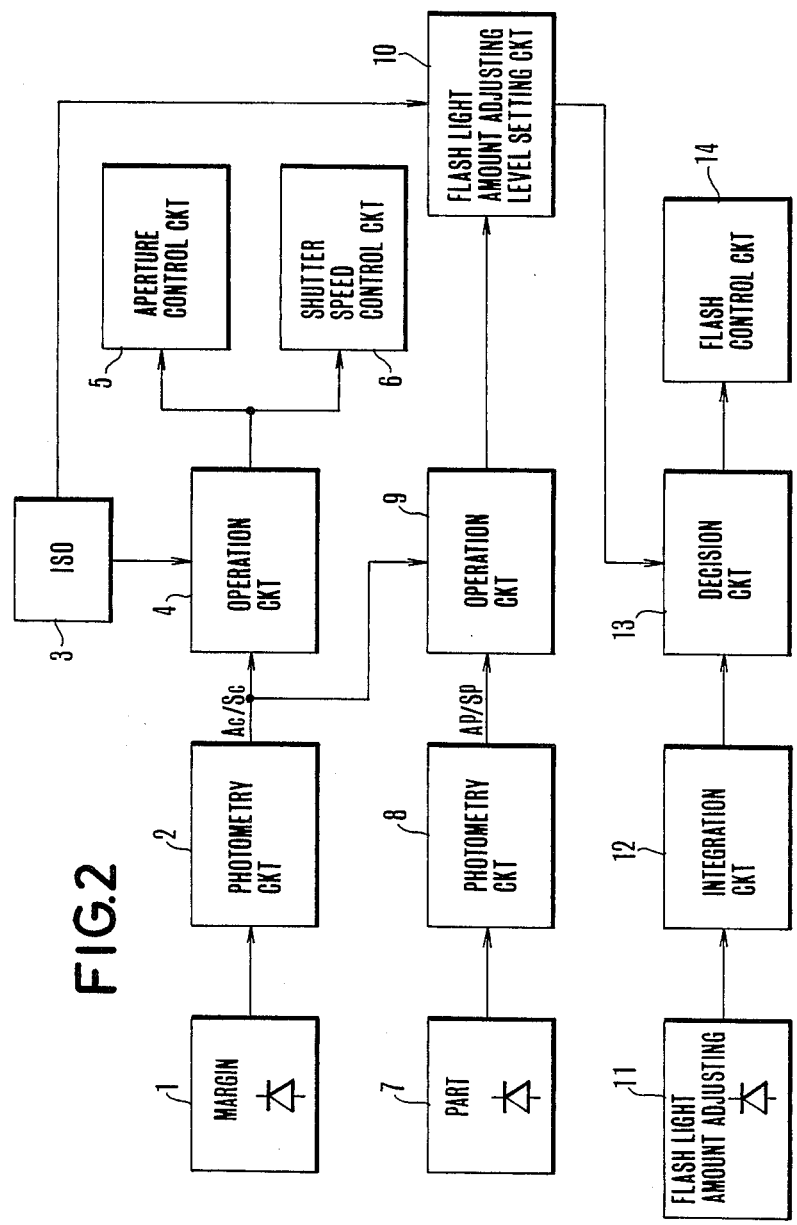
FIG. 2 is a block diagram of a light measuring apparatus which represents an embodiment of the present invention.

FIG. 2 shows a block diagram of a light measuring apparatus which represents an embodiment of the present invention to which the above-described principle of the photometry in accordance with the present invention is applied.

As shown in FIG. 2, the apparatus has: a marginal light receiving element 1 adapted for receiving light from the region A shown in FIG. 1(a); a photometry circuit 2 which is supplied with a signal from the light receiving element 1 and which outputs the above-described value $Bb = Ac/Sc$; a so-called program operation circuit 4 for calculating the aperture and the shutter speed on the basis of the output Bb of the photometry circuit 2, namely, the marginal luminance together with the film speed information ISO supplied from a film speed input circuit 3; and control circuits 5 and 6 for controlling the aperture and the shutter speed in the basis of the aperture value and the shutter speed value obtained by the operation circuit 4.

Other constituents and the functions of this apparatus are described below. A light receiving element 7 for partial light reading receives light from the region B shown in FIG. 1, and the output of this light receiving element 7 is supplied to a photometry circuit 8, thereby obtaining an output which corresponds to the above-described Ap/Sp. An operation circuit 9 is supplied with the output Ac/Sc from the above photometry circuit 2 and the output Ap/Sp from the photometry circuit 8 to effect an operation:

$$1 - \frac{Ap/Sp}{Ac/Sc}.$$

A flash light amount adjusting level setting circuit 10 calculates an equation:

$$As = A_0 \times \left(1 - \frac{Ap/Sp}{Ac/Sc}\right)$$

on the basis of $$1 - \frac{Ap/Sp}{Ac/Sc}$$

obtained by the operation circuit 9, thereby setting As as a flash light amount adjusting level. This flash light amount adjusting level setting circuit 10 determines the level of As on the basis of the ISO information supplied form the circuit 3.

A light receiving element 11 for flash light amount adjustment is adapted for receiving light with respect to the region C shown in FIG. 1(a). The region C is substantially the same as the region B.

An integration circuit 12 integrates the output of the light receiving element 11, and the output of this integration circuit is supplied to a decision circuit 13 which issues an output when the output of the integration circuit 12 reaches the level which has been set by the flash light amount adjusting level setting circuit 10. A flash control circuit 14 terminates the emission of flash in response to the output of the decision circuit 13.

In the above-described embodiment, the shutter speed and the aperture are determined on the basis of the output of the light receiving element 1 while the flash light amount adjusting level designated by As represented by the above equation (5) is being set by the level setting circuit 10 on the basis of the outputs of the light receiving elements 2 and 7, and the control circuit 14 terminates the emission of flash in response to the output of the decision circuit 13 which is supplied when the amount of flash received by the light receiving element 11 becomes equal to the above value As.

Incidentally, it goes without saying that the flash light amount adjusting level As is shifted on the basis of the ISO information supplied from the film speed setting circuit 3.

Figure 3:
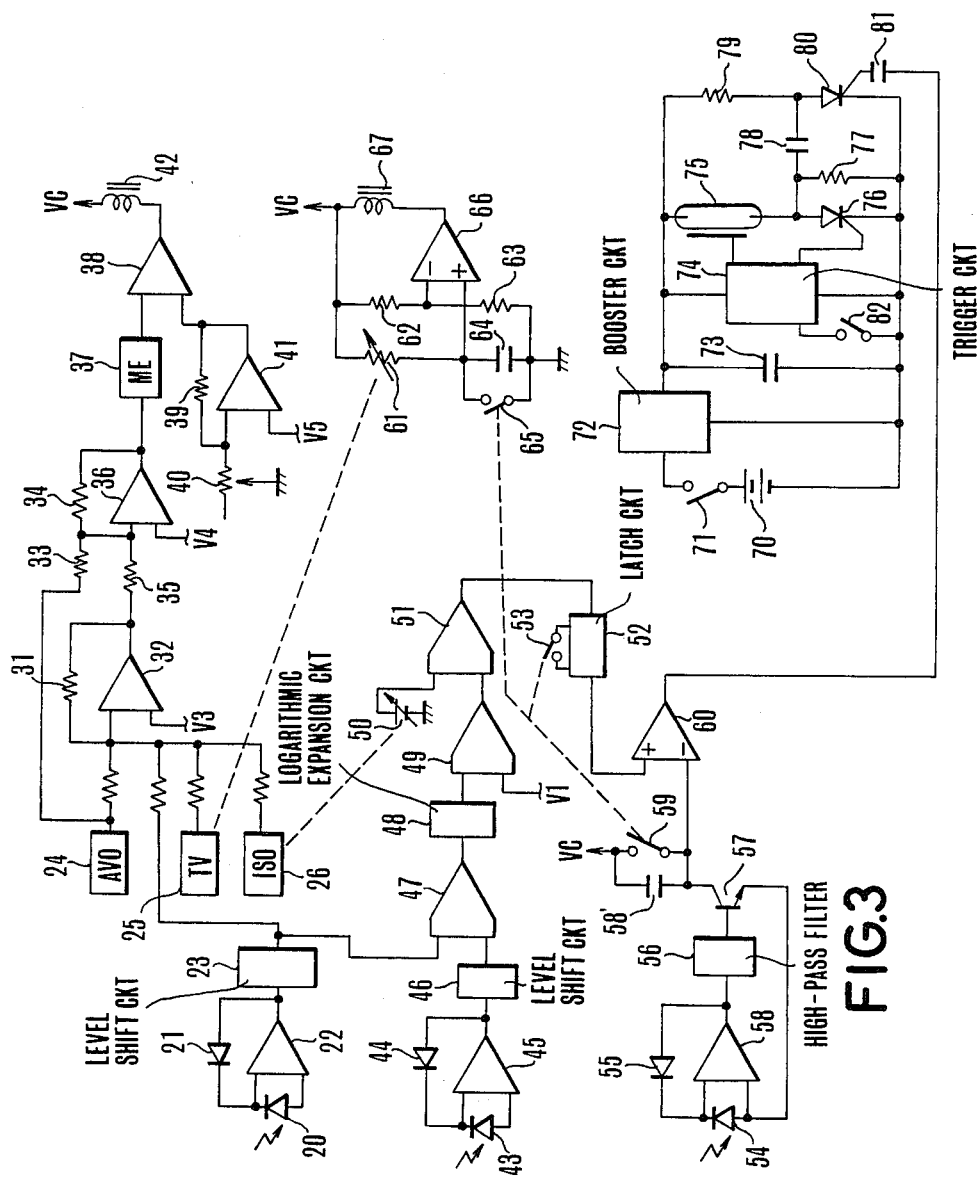
FIG. 3 is a circuit diagram of another example of the light measuring apparatus in accordance with the present invention applied to a single-lens reflex camera.

FIG. 3 shows a circuit diagram which exemplifies the arrangement of the apparatus in accordance with the present invention when the present invention is applied to a single-lens reflex camera.

In FIG. 3, a reference numeral 20 denotes a light receiving element adapted for receiving light introduced from the above-described region A; a reference numeral 21 denotes a diode; and a reference numeral 22 denotes an operational amplifier. These constituents operate to output a value log Ac which corresponds to the photometry output Ac obtained with respect to the marginal photometric region. A level shift circuit 23 in which the area Sc of the region A has been set effects the operation: log Ac−log Sc, namely, Ac/Sc.

The output of each of an $AV_0$ information setting circuit 24 for setting information $AV_0$ on the full-aperture $FN_0$, a shutter speed information setting circuit 25 for setting shutter speed information Tv which has been preset by means of a dial (not shown), etc, and a film speed information setting circuit 26 for setting the film speed information ISO is supplied, together with the output of the level shift circuit 23, to an amplifier 32. An aperture step determination circuit composed of the amplifier 32, an amplifier 36, and resistances 31, 33, 34 and 35 determines an aperture value $\Delta Av$ whereby the correct exposure is assured with respect to the background on the basis of the above-described photometry outputs.

A memory circuit 37 memorizes this aperture value $\Delta Av$ in response to an operation of the shutter release button. A resistance 40 changes its resistance value in linked relationship with the preview operation of a preview member which moves in response to this operation of the shutter release button, and the resistance value of this resistance indicates an amount of reduction of the aperture which is supplied to the comparator 38 by way of a buffer composed of an amplifier 41 and a resistance 39. The comparator 38 compares the output of the buffer with that of the memory circuit. When these outputs become equal to each other, the comparator energizes an electromagnet 42 so that the preview operation of the aperture control mechanism (not shown) is stopped, thereby determining the aperture.

The aperture value employed in a process of emitting flash is determined by the operations of the aperture determination circuit, etc. on the basis of the photometry output obtained with respect to the marginal region, thereby assuring a correct exposure with respect to the secondary object.

A variable resistance changes 61 its resistance value in association with the above-described circuit 25 to retain a preset shutter speed. A capacitor 64 together with the resistance 61 constitutes a timer. A count switch 65 is switched off in synchronized relationship with the operation of starting the exposure process, thereby starting the timer when the exposure process is commenced. A comparator 66 issues an output when the output of the timer reaches a value which is predetermined by potential dividing resistances 62 and 63. An electromagnet 67 for retaining a trailing curtain is thereby energized, and the trailing curtain of the shutter travels to finish the exposure process. These circuit elements 61 to 67 constitute a shutter speed control circuit.

A light receiving element 43 for partial light reading is adapted for receiving light with respect to the photometry region B shown in FIG. 1(a). An operational amplifier 45 and a diode 44 together with the light receiving element 43 constitute a photometry circuit which issues an output log Ap which corresponds to the above-described output Ap. A level shift circuit 46 in which an item of information corresponding to the area Sp of the light receiving region B effects an operation: log Ap − log Sp, namely, Ap/Sp on the basis of the above-described photometry output. An operation circuit 47 effects the subtraction of the outputs of the level shift circuits 23 and 46, namely, an operation: (log Ap−log Sp)−(log Ac−log Sc). A logarithmic expansion circuit 48 effect logarithmic expansion of the output of the operation circuit 47 to issue an output:

$$\frac{Ap/Sp}{Ac/Sc},$$

and an operation circuit 49 subtracts the output of the expansion circuit 48 from an input voltage of V1 (corresponding to 1), thereby effecting an operation:

$$1 - \frac{Ap/Sp}{Ac/Sc}.$$

A multiplication circuit 51 effects the multiplication of the output of a constant potential circuit 50 for forming a constant: $A_0 = P_0 S_p$ and the output of the operation circuit 49 to issue an output:

$$A_0 \times \left(1 - \frac{Ap/Sp}{Ac/Sc}\right).$$

The output $A_0$ of the constant potential circuit 50 is determined in accordance with the ISO information.

A switch 53 is switched off in linked relationship with the switch 65 when the exposure commences, and a latch circuit 52 latches the output of the multiplication circuit 51.

The circuit of the apparatus in accordance with the present invention is thus arranged in which the value As represented by the equation (5) is latched as the flash light amount adjusting level by the latch circuit 52 immediately before the commencement of the exposure.

Figure 4:
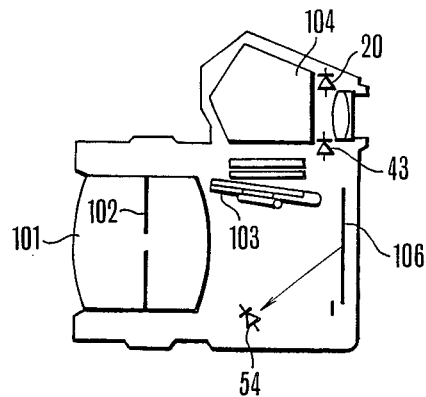
FIG. 4 is a diagram of the disposition of the light receiving elements of the apparatus shown in FIG. 3.

A light receiving element 54 for flash light amount adjustment is adapted for receiving light with respect to the region C shown in FIG. 1(a) and constitutes, together with the operational amplifier 58 and the diode 55, a photometry circuit. This light receiving element 54 is disposed such that, as shown in FIG. 4, it receives light which is introduced by way of a lens 10 an aperture 102 and is reflected by a film surface 106. Incidentally, the light receiving elements 20 and 43 are disposed in positions for receiving light introduced through an optical system of a view finder and by way of a pentagonal roof prism 104.

A high-pass filter 56 permits only high frequency components of the output of the amplifier 58 to pass therethrough, in other words, it permits the components of the output of the amplifier 58 which are generated only by the reception of flash to pass through it.

A transistor 57 is adapted for expanding operation, and the output of an transistor 57 is integrated by a capacitor 58'. A switch 59 is switched off in linked relationship with the switch 65, thereby starting an integrating operation for integrating, by means of the capacitor 58, the output of the transistor 57, namely, the output of the light receiving element 54 generated by the emission of flash when the exposure process is commenced.

A comparator 60 issues an output to finish the emission of flash effected by an electronic flash device which is described later, when the integrated value which is retained by the integrating capacitor 58 reaches the flash light amount adjusting level which has been latched by the latch circuit 52.

The apparatus is thus arranged, whereby the amount of flash is controlled in accordance with the equation (5), thereby assuring a correct exposure with respect to the main object.

The electronic flash device includes: a power source switch 71; a booster circuit 72 for boosting the output of a power source 70; a main capacitor 73 for accumulating flash energy; a synchronizing contact 82 which is turned on when the movement of a leading curtain is completed and the shutter is fully opened; a trigger circuit 74 which triggers a stroboscopic tube 75 in response to the on state of the synchronizing contact 82 and while tuning on a thyrister 76, thereby starting the emission of flash by means of the stroboscopic tube 75; a capacitor 81 for transmitting the output of the comparator 60; a thyrister 80; and a capacitor 78. The elements 77 to 81 in these elements form a known type of commutation circuit, and the emission of flash effected by the stroboscopic tube 75 is terminated in response to the output of the comparator 60.

The electronic flash apparatus is thus arranged, whereby the amount of flash emitted from the stroboscopic tube is controlled in accordance with the equation (5), thereby assuring the correct exposure with respect to the main object.

In the embodiment shown in FIG. 3, the light receiving elements 43 and 54 are provided separately from each other. Another embodiment in which one element has both functions of the partial light reading element and the light receiving element for flash light amount adjustment will be described below with reference to FIGS. 5 and 6.

Figure 5:
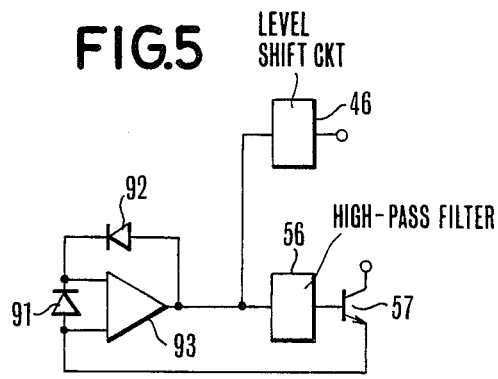
FIG. 5 is a circuit diagram of a light receiving portion which is another example of the arrangement shown in FIG. 3.

In FIG. 5, a reference numeral 91 denotes a light receiving element which is adapted for receiving light with respect to the region B shown in FIG. 1 and which constitutes, together with an amplifier 93 and a diode 92, a photometry circuit. The photometry circuit thus constituted may be connected to the level shift circuit 46 and the circuit 56 in place of the photometry circuit having the light receiving element 43. In this type of arrangement, it is possible for one photometry circuit to function as two circuits for partial light reading and for flash light amount adjustment. Other constituents are the same as those shown in FIG. 3, and the descriptions for them are omitted.

Figure 6:
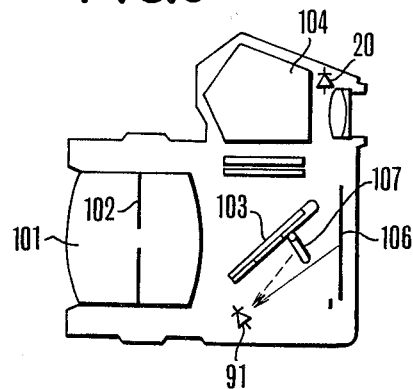
FIG. 6 is a diagram of the disposition of the light receiving elements employed in the light receiving portion shown in FIG. 5.

When a light receiving element is adapted in this manner for two functions, light for partial light reading may be introduced through a semi-transparent surface formed at the center of the mirror 103 and reflected by a sub-mirror 107 to a light receiving element 91, as shown in FIG. 6, and light reflected by the film surface 106 may be introduced to the light receiving element when the mirror is lifted.

A light receiving element for averaged overall light reading may be employed as the light receiving element for marginal light reading employed in the above-described embodiment. So-called TTL flash light amount adjustment is effected in this embodiment as the time of flash light amount adjusting operation, but the flash light amount adjusting operation may be effected by employing a light receiving element of a flash light amount adjusting strobe of an external light measuring type.

As described above, the light measuring apparatus in accordance with the present invention is capable of calculating the value of the correct amount of flash with respect to the main object if the main object overlaps the photometry region at least partially no matter how the size of the overlapped area relative to that of the photometry region may be. The light measuring apparatus in accordance with the present invention is thus suitable for use in flash photography such as daylight synchroflash photography.

What is claimed is:

1. An apparatus for determining an amount of flash during an illumination comprising:
    (a) a first light receiving element for measuring light coming from a center region of a frame of a photographic scene;
    (b) a second light receiving element for measuring light coming from a marginal region of the frame of the photographic scene, said second element having a different light receiving area from that of said first element;
    (c) a calculating circuit for calculating the ratio of the output per unit area of said first light receiving element to that of said second light receiving element;
    (d) flash light means for illuminating said photographic scene frame;
    (e) means for receiving flash light reflected from said center region of said frame in response to operation of said flash light means;
    (f) an integrating circuit for integrating the output of said flash light receiving means; and
    (g) a prohibiting circuit for terminating the flash operation of the flash light means when the integrated value by said integrating circuit reaches a value corresponding to the value calculated by said calculation circuit.

2. An apparatus according to claim 1, wherein said light receiving means is arranged on the bottom of a camera body at the position at which a light beam is received which reaches a film plane through a photographing lens and is reflected by the film plane.

3. An apparatus according to claim 2, wherein said first light receiving element is the same element as said flash light receiving means.

4. A flash photographic system composed of a flash device and a camera, comprising:
  (a) a first light receiving element for receiving light from a center region of the frame of the photography;
  (b) a second light receiving element for receiving light from a marginal region of said frame different from said center region;
  (c) a decision circuit for determining the amount of flash in accordance with the ratio of the outputs of said first and second light receiving elements;
  (d) a third light receiving element for receiving light which is emitted from the flash light device, and which reaches the object and is reflected from the object and reaches and is reflected from the film plane, said third light receiving element receiving light from said center region; and
  (e) a control circuit for detecting an integrated value of the output of said third light receiving element, said control circuit terminating the flash emitting operation of the flash device when said integrated value becomes equal to an amount of flash determined by said decision circuit.

5. A flash photographic system according to claim 4, wherein said third light receiving element is said first light receiving element.

6. A flash light photographing system consisting of a flash light device and a camera, comprising:
  (a) a first light receiving element for measuring light from the center region of a frame of a photographic scene, which measured light forms a part of the light incident on a view finder via view finder optics of the camera;
  (b) a second light receiving element for measuring light from the marginal region of the frame, which measured light is received through said view-finder optics of the camera, said second light receiving element having a light receiving area different from that of said first light receiving element;
  (c) a calculation circuit for calculating the ratio of the output of said first light receiving element from that of said second light receiving element, said calculation circuit calculating the ratio of each output in such a modified manner that the output of said first light receiving element and that of said second light receiving element are for the same area;
  (d) a flash light means arranged on the flash light device for producing a flash light in association with the shutter opening operation;
  (e) a third light receiving element for receiving a light from the center region which is emitted from said flash light device, and which is reflected by the object and reaches and is reflected by the film plane;
  (f) a latch circuit for latching the output calculated by said calculation circuit before the flashing of said flash light device;
  (g) an integration circuit for integrating the output of said third light receiving element;
  (h) a flash light stop circuit for terminating the flashing of the flash light device when the output of said integration circuit reaches a value corresponding to the flash light amount corresponding to the calculation output latched by said latch circuit.

* * * * *

UNITED STATES PATENT AND TRADEMARK OFFICE
CERTIFICATE OF CORRECTION

PATENT NO. : 4,769,666

DATED : September 6, 1988

INVENTOR(S) : Toshiyuki Kumakura

It is certified that error appears in the above-identified patent and that said Letters Patent is hereby corrected as shown below:

COLUMN 1

Line 10, "Art:" should read --Art--.

COLUMN 2

Line 26, "photomatry principle of" should read --principle of photometry--.

COLUMN 3

Line 58, "luminace" should read --luminance--.

COLUMN 4

Line 26, "in" should read --on--; and

Line 60, "form" should read --from--.

COLUMN 6

Line 30, "effect" should read --effects--.

COLUMN 7

Line 2, "lens 10" should read --lens 10,--;

Line 14, "an" should read --a--; and

Line 40, "tuning" should read --turning--.

UNITED STATES PATENT AND TRADEMARK OFFICE
CERTIFICATE OF CORRECTION

PATENT NO. : 4,769,666

DATED : September 6, 1988

INVENTOR(S) : Toshiyuki Kumakura

It is certified that error appears in the above-identified patent and that said Letters Patent is hereby corrected as shown below:

COLUMN 8

Line 17, "as" should read --at--; and

Line 27, "how" should read --what--.

COLUMN 10

Line 27, "element;" should read --element; and--.

Signed and Sealed this

Twentieth Day of June, 1989

Attest:

DONALD J. QUIGG

Attesting Officer

Commissioner of Patents and Trademarks